US012762408B2

(12) United States Patent
Kim

(10) Patent No.: US 12,762,408 B2
(45) Date of Patent: Oct. 13, 2026

(54) NEUROMORPHIC APPARATUS AND METHOD WITH NEURAL NETWORK

(71) Applicant: Samsung Electronics Co., Ltd., Suwon-si (KR)

(72) Inventor: Hyunsoo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 956 days.

(21) Appl. No.: 17/078,714

(22) Filed: Oct. 23, 2020

(65) Prior Publication Data

US 2021/0406694 A1 Dec. 30, 2021

(30) Foreign Application Priority Data

Jun. 24, 2020 (KR) ........................ 10-2020-0077376

(51) Int. Cl.

*G06N 3/084* (2023.01)
*G06F 18/00* (2023.01)
*G06N 3/04* (2023.01)
*G06N 3/044* (2023.01)
*G06N 3/045* (2023.01)
*G06N 3/0464* (2023.01)
*G06N 3/048* (2023.01)
*G06N 3/065* (2023.01)
*G06N 3/082* (2023.01)
*G06N 3/088* (2023.01)
*G06N 3/09* (2023.01)

(52) U.S. Cl.

CPC ............... *G06N 3/084* (2013.01); *G06N 3/04* (2013.01); *G06N 3/088* (2013.01)

(58) Field of Classification Search

CPC .......... G06N 3/084; G06N 3/04; G06N 3/088; G06N 3/044; G06N 3/045; G06N 3/048; G06N 3/063; G06N 3/082; G06F 18/00
See application file for complete search history.

(56) References Cited

U.S. PATENT DOCUMENTS 6,038,337 A 3/2000 Lawrence et al.
10,387,774 B1 8/2019 Cao et al.
(Continued)

FOREIGN PATENT DOCUMENTS

CN 106897734 A 6/2017
CN 109359724 A 2/2019
(Continued)

OTHER PUBLICATIONS

Mu-Chun Su and Hsiao-Te Chang, "Fast self-organizing feature map algorithm," in IEEE Transactions on Neural Networks, vol. 11, No. 3, pp. 721-733, May 2000, doi: 10.1109/72.846743. (Year: 2000).*

(Continued)

*Primary Examiner* — Usmaan Saeed
*Assistant Examiner* — Hyungjun B Yi
(74) *Attorney, Agent, or Firm* — NSIP Law

(57) ABSTRACT

A processor-implemented neural network implementation method includes: learning each of first layers included in a neural network according to a first method; learning at least one second layer included in the neural network according to a second method; and generating output data from input data by using the learned first layers and the learned at least one second layer.

12 Claims, 13 Drawing Sheets

<BIOLOGICAL NEURON>

<MATHEMATICAL MODEL OF BIOLOGICAL NEURON >

(56) References Cited

U.S. PATENT DOCUMENTS

| | | | |
|---|---|---|---|
| 2011/0191274 | A1 | 8/2011 | Yu et al. |
| 2016/0321542 | A1 | 11/2016 | Towal |
| 2018/0158189 | A1 | 6/2018 | Yedla et al. |
| 2018/0174031 | A1 | 6/2018 | Yang et al. |
| 2018/0268234 | A1 | 9/2018 | Yang et al. |
| 2018/0284741 | A1 | 10/2018 | Cella et al. |
| 2018/0293493 | A1 | 10/2018 | Kalamkar et al. |
| 2019/0230354 | A1 | 7/2019 | Kim |
| 2020/0184315 | A1 | 6/2020 | Kim et al. |
| 2022/0222508 | A1* | 7/2022 | Takac et al. |

FOREIGN PATENT DOCUMENTS

| | | | |
|---|---|---|---|
| CN | 109740734 | A | 5/2019 |
| JP | 2018-518740 | A | 7/2018 |
| JP | 2020-71755 | A | 5/2020 |
| KR | 10-2018-0001428 | A | 1/2018 |
| KR | 10-2020-0069901 | A | 6/2020 |
| WO | WO2016175925 | A1 * | 11/2016 |

OTHER PUBLICATIONS

Lee C, Panda P, Srinivasan G, Roy K. Training Deep Spiking Convolutional Neural Networks With STDP-Based Unsupervised Pre-training Followed by Supervised Fine-Tuning. Front Neurosci. Aug. 3, 2018;12:435. doi: 10.3389/fnins.2018.00435. PMID: 30123103; PMCID: PMC6085488. (Year: 2018).*

Mu-Chun Su and Hsiao-Te Chang, "Fast self-organizing feature map algorithm," in IEEE Transactions on Neural Networks, vol. 11, No. 3, pp. 721-733, May 2000, doi: 10.1109/72.846743 (Year: 2020).*

Aly, S., & Aly, W. (2020). DeepArSLR: A novel signer-independent deep learning framework for isolated arabic sign language gestures recognition. IEEE Access, 8, 83199-83212. (Year: 2020).*

Aly, S., & Almotairi, S. (2020). Deep convolutional self-organizing map network for robust handwritten digit recognition. IEEE Access, 8, 107035-107045. (Year: 2020).*

Dozono, H., Niina, G., & Araki, S. (Dec. 2016). Convolutional self organizing map. In 2016 international conference on computational science and computational intelligence (CSCI) (pp. 767-771). IEEE. (Year: 2016).*

Mohebi, E., & Bagirov, A. (Oct. 2014). CR-Modified SOM to the Problem of Handwritten Digits Recognition. In International Conference on Innovative Techniques and Applications of Artificial Intelligence (pp. 225-238). Cham: Springer International Publishing. (Year: 2014).*

Wickramasinghe, C. S., Amarasinghe, K., & Manic, M. (2019). Deep self-organizing maps for unsupervised image classification. IEEE Transactions on Industrial Informatics, 15(11), 5837-5845. (Year: 2019).*

Stuhr, B., & Brauer, J. (Dec. 2019). Csnns: Unsupervised, backpropagation-free convolutional neural networks for representation learning. In 2019 18th IEEE International Conference on Machine Learning and Applications (ICMLA) (pp. 1613-1620). IEEE. (Year: 2019).*

Wang, M., Zhou, W., Tian, Q., Pu, J., & Li, H. (Oct. 2017). Deep supervised quantization by self-organizing map. In Proceedings of the 25th ACM international conference on Multimedia (pp. 1707-1715). (Year: 2017).*

Kohonen, Teuvo. "The Self-Organizing Map", *Proceedings of the IEEE*, 78, 9, 1990 (pp. 1464-1480).

Lecun, Yann, et al., "Gradient-Based Learning Applied to Document Recognition", *Proceedings of the IEEE*, 86, 11, 1998 (pp. 2278-2324).

Vesanto, Juha, et al., "Clustering of the Self-Organizing Map", *IEEE Transactions on neural networks*, vol. 11, No. 3, May 2000 (pp. 586-600).

Yam, Jim YF, et al., "A weight initialization method for improving training speed in feedforward neural network", *Neurocomputing*, 30, 1-4. 2000 (pp. 219-232).

Pascanu, Razvan, et al., "On the difficulty of training recurrent neural networks", *International conference on machine learning*, Feb. 16, 2013 (pp. 1-12).

Simonyan, Karen et al.. "Very Deep Convolutional Networks for Large-Scale Image Recognition." *arXiv preprint arXiv:1409.1556*, 2014 (pp. 1-14).

Courbariaux, Matthieu et al., "Binaryconnect: Training Deep Neural Networks with Binary Weights During Propagations", *Advances in neural information processing systems*, 28, 2015 (pp. 3123-3131).

Han, Song, et al., "Deep Compression: Compressing Deep Neural Networks with Pruning, Trained Quantization and Huffman Coding", *arXiv preprint arXiv:1510.00149*, 2015 (pp. 1-14).

Schmidhuber, Jürgen., "Deep Learning in Neural Networks: An Overview", *Neural networks*, 61, 2015 (pp. 85-117).

Szegedy, Christian, et al., "Going deeper with convolutions", *Proceedings of the IEEE conference on computer vision and pattern recognition*, 2015 (pp. 1-12).

Aviles, Juan C et al., "Position-Aided mm-Wave Beam Training under NLOS Conditions." *IEEE Access* 4, 2016 (pp. 8703-8714).

Canziani, Alfredo et al., "An Analysis of Deep Neural Network Models for Practical Applications", *arXiv preprint arXiv:1605.07678*, 2016 (pp. 1-7).

Courbariaux, Matthieu, et al., "Binarized Neural Networks: Training Deep Neural Networks with Weights and Activations Constrained to+ 1 or-1", *arXiv preprint arXiv:1602.02830*, Mar. 17, 2016 (pp. 1-11).

Dozono, Hiroshi, et al., "Convolutional Self Organizing Map", *2016 international conference on computational science and computational intelligence (CSCI). IEEE*, 2016 (pp. 767-771).

He, Kaiming, et al., "Deep Residual Learning for Image Recognition." *Proceedings of the IEEE conference on computer vision and pattern recognition*, 2016 (pp. 1-12).

Iandola, Forrest N., et al., "SqueezeNet: AlexNet-level Accuracy with 50x Fewer Parameters and< 0.5 MB Model Size", *arXiv preprint arXiv:1602.07360*, Nov. 4, 2016 (pp. 1-13).

Li, Hao, et al., "Pruning Filters for Efficient Convnets", *arXiv preprint arXiv:1608.08710*, 2016 (pp. 1-13).

Lin, Darryl, et al., "Fixed Point Quantization of Deep Convolutional Networks." *International conference on machine learning*, Jun. 2, 2016 (pp. 1-10).

Rastegari, Mohammad, et al., "XNOR-Net: ImageNet Classification Using Binary Convolutional Neural Networks", *European conference on computer vision. Springer, Cham*, Aug. 2, 2016 (pp. 1-17).

Salimans, Tim et al., "Weight Normalization: A Simple Reparameterization to Accelerate Training of Deep Neural Networks", *arXiv preprint arXiv:1602.07868*, Jun. 4, 2016 (pp. 1-11).

Zhu, Chenzhuo, et al., "Trained Ternary Quantization", *arXiv preprint arXiv:1612.01064*, 2016 (pp. 1-10).

Alemdar, Hande, et al., "Ternary Neural Networks for Resource-Efficient AI Applications", *2017 International Joint Conference on Neural Networks (IJCNN)*, IEEE, 2017 (pp. 2547-2554).

Hubara, Itay, et al., "Quantized Neural Networks: Training Neural Networks with Low Precision Weights and Activations", *The Journal of Machine Learning Research*, 18, 1, 2017 (pp. 6869-6898).

Krizhevsky, Alex, et al., "ImageNet Classification with Deep Convolutional Neural Networks", *Communications of the ACM*, 60, 6, 2017 (pp. 84-90).

Li, Hao, et al., "Training Quantized Nets: A Deeper Understanding", *Advances in Neural Information Processing Systems*, Nov. 13, 2017 (pp. 1-18).

Lin, Xunyu, et al., "Disentangling Motion, Foreground and Background Features in Videos", *arXiv preprint arXiv:1707.04092*, Jul. 17, 2017 (pp. 1-5).

Howard, Andrew G., et al., "MobileNets: Efficient Convolutional Neural Networks for Mobile Vision Applications", *arXiv preprint arXiv:1704.04861*, Apr. 17, 2017 (pp. 1-9).

Mellempudi, Naveen, et al., "Ternary Neural Networks with Fine-Grained Quantization", *arXiv preprint arXiv:1705.01462*, May 30, 2017 (pp. 1-11).

Zhang, Xiangyu, et al., "Shufflenet: An Extremely Efficient Convolutional Neural Network for Mobile Devices", *Proceedings of the IEEE conference on computer vision and pattern recognition*, 2018 (pp. 1-9).

(56) References Cited

OTHER PUBLICATIONS

An, Fengwei, et al. "VLSI Realization of Learning Vector Quantization with Hardware/Software Co-Design for Different Applications." *Japanese Journal of Applied Physics* vol. 5404DE05, Mar. 19, 2015 (6 pages in English).
Nie, Lei, et al. "Periocular Recognition using Unsupervised Convolutional RBM Feature Learning." *22nd International Conference on Pattern Recognition, IEEE Computer Society US*, Aug. 24, 2014 pp. 399-404.
Extended European Search Report issued on Jul. 30, 2021 in counterpart European Patent Application No. 21153746.9 (14 pages in English).
Chinese Office Action issued on Apr. 1, 2025, in corresponding Chinese Patent Application No. 202011405659.7. (11pages in English, 7pages in Chinese).
Dawwd, Shefa A., and Basil Sh Mahmood. "Time sharing based parallel implementation of CNN on low cost FPGA." 2018 International Conference on Advanced Science and Engineering (ICOASE). IEEE, Oct. 9, 2018. (pp. 54-59).
European Office Communication issued on Mar. 10, 2025, in counterpart European Patent Application No. 21153746.9 (8pages in English).
Japanese Office Action issued on Apr. 22, 2025, in corresponding Japanese Patent Application No. 2021-104263. (7pages in English, 5pages in Japanese).
Schuman, Catherine D., et al. "A survey of neuromorphic computing and neural networks in hardware." arXiv preprint arXiv:1705.06963, May 19, 2017. (pp. 1-89).
Uehara, Yasushi, "Mathematical properties of Deep Learning", Mizuho Information & Research Institute Technical Report, vol. 6, No. 1, 2014. (pp. 1-6).
Hochreiter, Sepp, et al. "Gradient flow in recurrent nets: the difficulty of learning long-term dependencies." (2001).
Korean Office Action issued on Feb. 2, 2026, in counterpart Korean Patent Application No. 10-2020-0077376 (8 pages in English, 10 pages in Korean).

* cited by examiner

NEUROMORPHIC APPARATUS AND METHOD WITH NEURAL NETWORK

CROSS-REFERENCE TO RELATED APPLICATION

This application claims the benefit under 35 USC § 119(a) of Korean Patent Application No. 10-2020-0077376, filed on Jun. 24, 2020, in the Korean Intellectual Property Office, the entire disclosure of which is incorporated herein by reference for all purposes.

BACKGROUND

1. Field

The present disclosure relates a neuromorphic apparatus and method with a neural network.

2. Description of Related Art

Memory-based neural network apparatuses may refer to computational architectures modeling biological brains. Electronic systems may analyze input data using memory-based neural networks and extract valid information.

However, such electronic systems may not efficiently process operations such as analyzing a massive amount of input data using memory-based neural network in real-time and extracting desired information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network implementation method includes: learning each of first layers included in a neural network according to a first method; learning at least one second layer included in the neural network according to a second method; and generating output data from input data by using the learned first layers and the learned at least one second layer.

The first method may include a method corresponding to unsupervised learning.

The first method may include a method corresponding to a self-organizing map.

The second method may include a method corresponding to supervised learning.

The second method may include a method corresponding to back-propagation.

The first layers may include convolutional layers and the at least one second layer may include at least one fully-connected layer.

The learning according to the first method may include: generating partial input vectors based on input data of an initial layer of the first layers; learning the initial layer, based on the partial input vectors using a self-organizing map corresponding to the initial layer; and generating output feature map data of the initial layer using the learned initial layer.

The learning of the initial layer may include: determining, using the self-organizing map, an output neuron, among output neurons, having a weight most similar to at least one of the partial input vectors; updating, using the self-organizing map, a weight of at least one output neuron located in a determined range of the output neurons based on the determined output neuron; and learning the initial layer based on the updated weight.

The generating of the output feature map data of the initial layer may include: generating the partial input vectors based on the input data; and determining a similarity between the partial input vectors and the updated weight.

The method may include learning a next layer of the first layers based on the output feature map data of the initial layer.

The generating of the output data may include: generating output feature map data by applying the input data to the learned first layers; and generating the output data by applying the output feature map data to the learned at least one second layer.

A non-transitory computer-readable storage medium may store instructions that, when executed by one or more processors, configure the one or more processors to perform the method.

In another general aspect, a processor-implemented neural network includes: a plurality of convolutional layers; and at least one fully-connected layer, wherein the plurality of convolutional layers and the at least one fully-connected layer are trained by different methods.

The plurality of convolutional layers may be trained by a method corresponding to unsupervised learning.

The plurality of convolutional layers may be trained by a method corresponding to a self-organizing map.

The at least one fully-connected layer may be trained by a method corresponding to supervised learning.

The at least one fully-connected layer may be trained by a method corresponding to back-propagation.

In another general aspect, a neuromorphic neural network implementation apparatus includes: a processor configured to learn each of first layers included in the neural network according to a first method, learn at least one second layer included in the neural network according to a second method, and generate output data from input data by using the learned first layers and the learned at least one second layer.

The first method may include a method corresponding to unsupervised learning.

The first method may include a method corresponding to a self-organizing map.

The second method may include a method corresponding to supervised learning.

The second method may include a method corresponding to back-propagation.

The first layers may include convolutional layers and the at least one second layer may include at least one fully-connected layer.

For the learning according to the first method, the processor may be configured to generate partial input vectors based on input feature map data of an initial layer of the first layers, learn the initial layer based on the partial input vectors using a self-organizing map corresponding to the initial layer, and generate output feature map data of the initial layer using the learned initial layer.

For the learning of the initial layer, the processor may be configured to determine, using the self-organizing map, an output neuron, among output neurons, having a weight most similar to at least one of the partial input vectors, update, using the self-organizing map, a weight of at least one output neuron located in a determined range of the output neurons based on the determined output neuron, and learn the initial layer based on the updated weight.

For the generating of the output feature map data of the initial layer, the processor may be configured to generate the partial input vectors based on the input data, and determine a similarity between the partial input vectors and the updated weight.

The processor may be configured to learn a next layer of the first layers based on the output feature map data of the initial layer.

For the generating of the output data, the processor may be configured to generate output feature map data by applying the input data to the learned first layers, and generate the output data by applying the output feature map data to the learned at least one second layer.

The apparatus may include an on-chip memory comprising a plurality of cores and storing one or more instructions that, when executed by the processor, configure the processor to: perform the learning of each of the first layers; perform the learning of the at least one second layer; and drive the neural network to perform the generating of the output data.

In another general aspect, a processor-implemented neural network implementation method includes: generating a partial input vector based on input data of a convolutional layer of a neural network; determining, using a self-organizing map, an output neuron, among output neurons, having a weight most similar to the partial input vector; updating, using the self-organizing map, a weight of at least one output neuron located in a determined range of the output neurons based on the determined output neuron; and learning the convolutional layer based on the updated weight.

The method may include: generating, using the learned initial layer, output feature map data of the convolutional layer based on the input data; and learning a next convolutional layer of the neural network based on the output feature map data of the initial layer.

The method may include receiving image input data and generating, using the learned convolutional layer, identification result output data based on the image input data.

Other features and aspects will be apparent from the following detailed description, the drawings, and the claims.

BRIEF DESCRIPTION OF THE DRAWINGS

The above and other aspects, features, and advantages of certain embodiments of the disclosure will be more apparent from the following description taken in conjunction with the accompanying drawings, in which.

Figure 1:
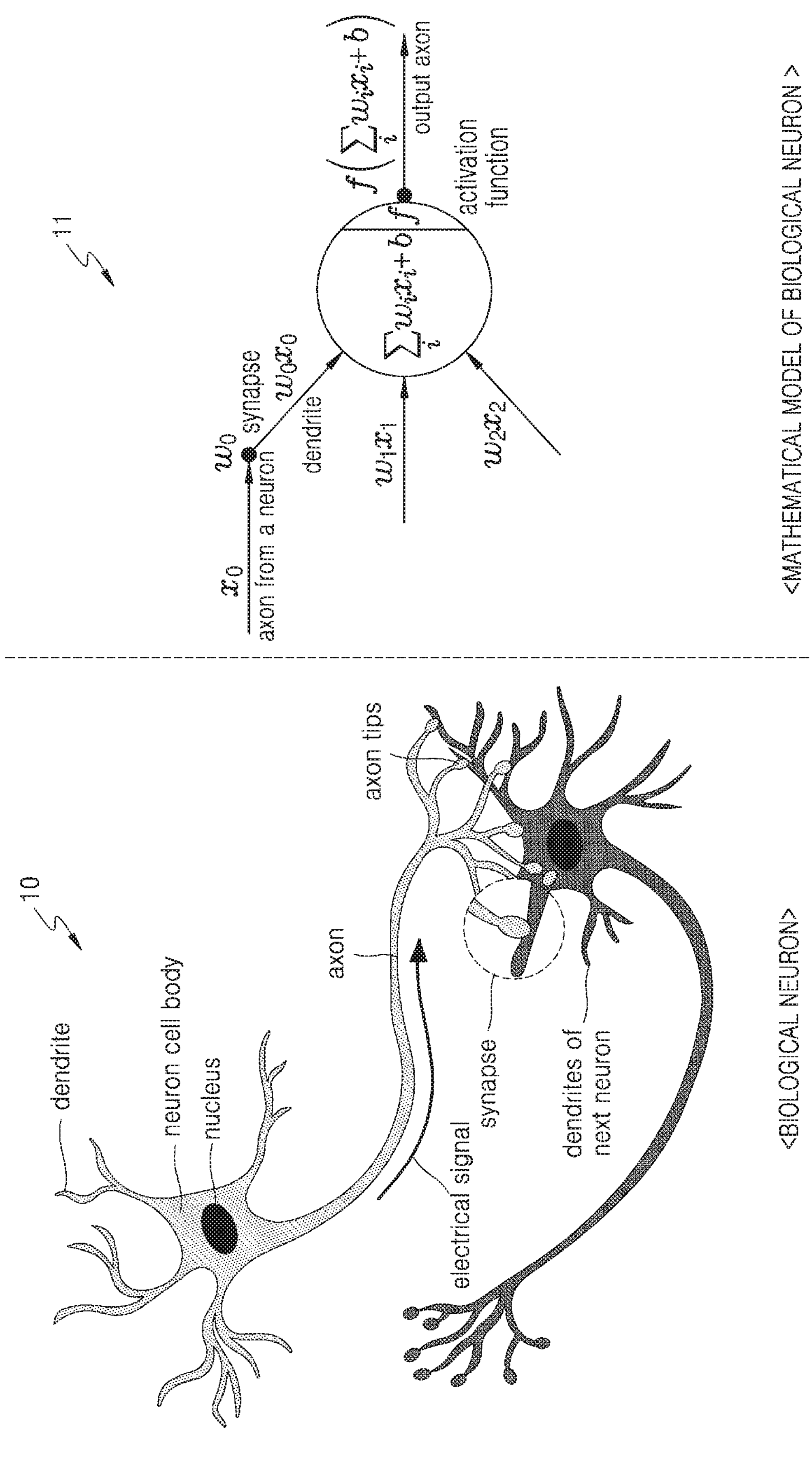
FIG. 1 illustrates a neural network node model simulating an operation of a biological neuron according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Reference will now be made in detail to embodiments, examples of which are illustrated in the accompanying drawings, wherein like reference numerals refer to like elements throughout. In this regard, the one or more embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The term used in the embodiments such as "unit", etc., indicates a unit for processing at least one function or operation, and where the unit is hardware or a combination of hardware and software. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Hereinafter, embodiments will be described in detail with reference to accompanying drawings. However, the embodiments may be implemented in many different forms and are not limited to those described herein.

Hereinafter, embodiments will be described in detail with reference to accompanying drawings.

FIG. 1 illustrates a neural network node model simulating an operation of a biological neuron according to one or more embodiments.

Biological neurons denote cells present in a human nervous system. The biological neuron is one of basic biological computational entities. The human brain contains approximately 100 billion biological neurons and 100 trillion interconnects between the biological neurons.

Referring to FIG. 1, a biological neuron 10 may be a single cell. The biological neuron 10 may include a neuron cell body including a nucleus and various organelles. The various organelles may include mitochondria, a plurality of dendrites radiating from the neuron cell body, and axons terminating at many branch extensions.

The axon may perform a function of transmitting signals from one neuron to another neuron, and the dendrite may perform a function of receiving the signal from the one neuron. For example, when different neurons are connected to each other, a signal transmitted via an axon of a neuron may be received by a dendrite of another neuron. Here, the signal may be transferred via a specified connection called a synapse between the neurons and several neurons may be connected to each other to form a biological neural network. Based on the synapse, a neuron that secretes a neurotransmitter may be referred to as a pre-synaptic neuron and a neuron that receives information transmitted via the neurotransmitter may be referred to as a post-synaptic neuron.

A human brain may learn and memorize a massive amount of information by transmitting and processing various signals via a neural network formed as a large number of neurons connected to each other. Similar to a large number of connections between the neurons in the human brain associated with a massively parallel nature of biological computing, the neuromorphic apparatus of one or more embodiments may efficiently process a similarly massive amount of information using an artificial neural network. For example, the neuromorphic apparatus of one or more embodiments may implement the artificial neural network in an artificial neuron level.

Operations of the biological neuron 10 may be simulated by a neural network node model 11. The neural network node model 11 corresponding to the biological neuron 10 may be an example of a neuromorphic operation and may include multiplication where information from a plurality of neurons or nodes is multiplied by a synaptic weight, addition (Σ) of values ($\omega_0 x_0$, $\omega_1 x_1$, and $\omega_2 x_2$) to which a synaptic weight is multiplied, and an operation of applying a characteristic function (b) and an activation function (f) to a result of the addition. A neuromorphic operation result may be provided via the neuromorphic operation. Here, values such as $x_0$, $x_1$, and $x_2$ correspond to axon values and values such as $\omega_0$, $\omega_1$, and $\omega_2$ correspond to synaptic weights. While the nodes and weights of the neural network node model 11 may be respectively referred to as "neurons" and "synaptic weights," the terms are merely terms of art referring to the hardware implemented nodes and weights of a neural network.

Figure 2:
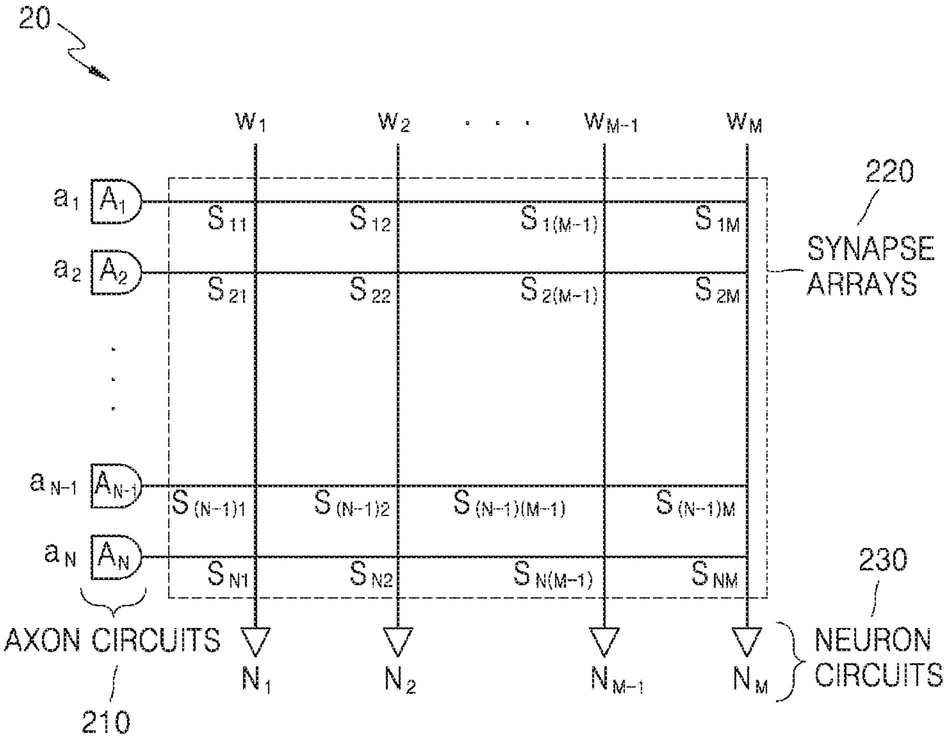
FIG. 2 illustrates a configuration of a 2-dimensional (2D) array circuit for performing a neuromorphic operation according to one or more embodiments.

FIG. 2 illustrates a configuration (e.g., a configuration 20) of a 2-dimensional (2D) array circuit for performing a neuromorphic operation according to one or more embodiments.

Referring to FIG. 2, the configuration 20 of the 2D array circuit includes N axon circuits $A_1$ through $A_N$ 210 (N is any natural number), M neuron circuits $N_1$ through $N_M$ 230 (M is any natural number), and N×M synapse arrays $S_{11}$ through $S_{NM}$ 220. While the circuits and arrays may be referred to as "axon circuits," "neuron circuits" and/or "synapse arrays," such terms are merely terms of art referring to the hardware-implemented array circuit.

Each synapse of the synapse arrays $S_{11}$ through $S_{NM}$ 220 may be arranged at intersections of first direction lines extending in a first direction from the axon circuits $A_1$ through $A_N$ 210 and second direction lines extending in a second direction from the neuron circuits $N_1$ through $N_M$ 230. Here, for convenience of direction, the first direction is illustrated as a row direction and the second direction is illustrated as a column direction, but an embodiment is not limited thereto, and the first direction may be a column direction and the second direction may be a row direction.

Each of the axon circuits $A_1$ through $A_N$ 210 may denote a circuit simulating an axon of the biological neuron 10 of FIG. 1. An axon of a neuron may perform a function of transmitting signals from the neuron to another neuron, and each of the axon circuits $A_1$ through $A_N$ 210 simulating the axon of the neuron may receive activations (for example, axons $a_1$ through $a_N$) and transmit the activations to the first direction lines. The activation may correspond to a neurotransmitter transmitted through the neuron and may denote an electric signal input to each of the axon circuits $A_1$ through $A_N$ 210. Each of the axon circuits $A_1$ through $A_N$ 210 may include a memory, register, and/or buffer for storing input information. The activation may be a binary activation having a binary value. For example, the binary activation may include 1-bit information corresponding to a logic value 0 or 1. However, an embodiment is not limited thereto, and the activation may have a ternary value or a multi-bit value.

Each synapse of the synapse arrays $S_{11}$ through $S_{NM}$ 220 may denote a circuit simulating a synapse between neurons. The synapse arrays $S_{11}$ through $S_{NM}$ 220 may store synaptic weights corresponding to connection strengths between neurons. In FIG. 2, for convenience of description, $w_1$ through $w_M$ are shown as examples of the synaptic weights to be stored in each synapse, but other synaptic weights may be stored in each synapse. Each synapse of the synapse arrays $S_{11}$ through $S_{NM}$ 220 may include a memory device for storing a synaptic weight or may be connected to another memory device storing a synaptic weight. Such a memory device may correspond to, for example, a memristor.

The synapse arrays $S_{11}$ through $S_{NM}$ 220 may receive activation inputs from the axon circuits $A_1$ through $A_N$ 210 via the first direction lines, respectively, and output results of neuromorphic operations between stored synaptic weights and the activation inputs. For example, the neuromorphic operation between the synaptic weight and the activation input may be multiplication (i.e., an AND operation), but is not limited thereto. In other words, a result of the neuromorphic operation between the synaptic weight and the activation input may be a value obtained by any suitable operation for simulating the strength or the size of activation adjusted according to the connection strength between the neurons.

The size or strength of signals transmitted from the axon circuits $A_1$ through $A_N$ 210 to the neuron circuits $N_1$ through $N_M$ 230 may be adjusted according to the neuromorphic operations between the synaptic weights and the activation inputs. As such, an operation of adjusting the size or strength of a signal transmitted to another neuron according to the connection strength between neurons may be simulated by using the synapse arrays $S_{11}$ through $S_{NM}$ 220.

Each of the neuron circuits $N_1$ through $N_M$ 230 may denote a circuit simulating a neuron including a dendrite. A dendrite of a neuron may perform a function of receiving a signal from another neuron, and each of the neuron circuits $N_1$ through $N_M$ 230 may receive the result of the neuromorphic operation between the synaptic weight and the activation input via the corresponding second direction line. Each of the neuron circuits $N_1$ through $N_M$ 230 may determine whether to output a spike based on the result of the neuromorphic operation. For example, each of the neuron circuits $N_1$ through $N_M$ 230 may output the spike when a value obtained by accumulating the results of neuromorphic operations is equal to or greater than a pre-set threshold value. The spikes output from the neuron circuits $N_1$ through $N_M$ 230 may correspond to activations input to axon circuits of a next stage.

Because the neuron circuits $N_1$ through $N_M$ 230 are located at operational rear ends with respect to the synapse arrays $S_{11}$ through $S_{NM}$ 220, the neuron circuits $N_1$ through $N_M$ 230 may be referred to as post-synaptic neuron circuits and because the axon circuits $A_1$ through $A_N$ 210 are located at operational front ends with respect to the synapse arrays $S_{11}$ through $S_{NM}$ 220, the axon circuits $A_1$ through $A_N$ 210 may be referred to as pre-synaptic neuron circuits.

Figure 3:
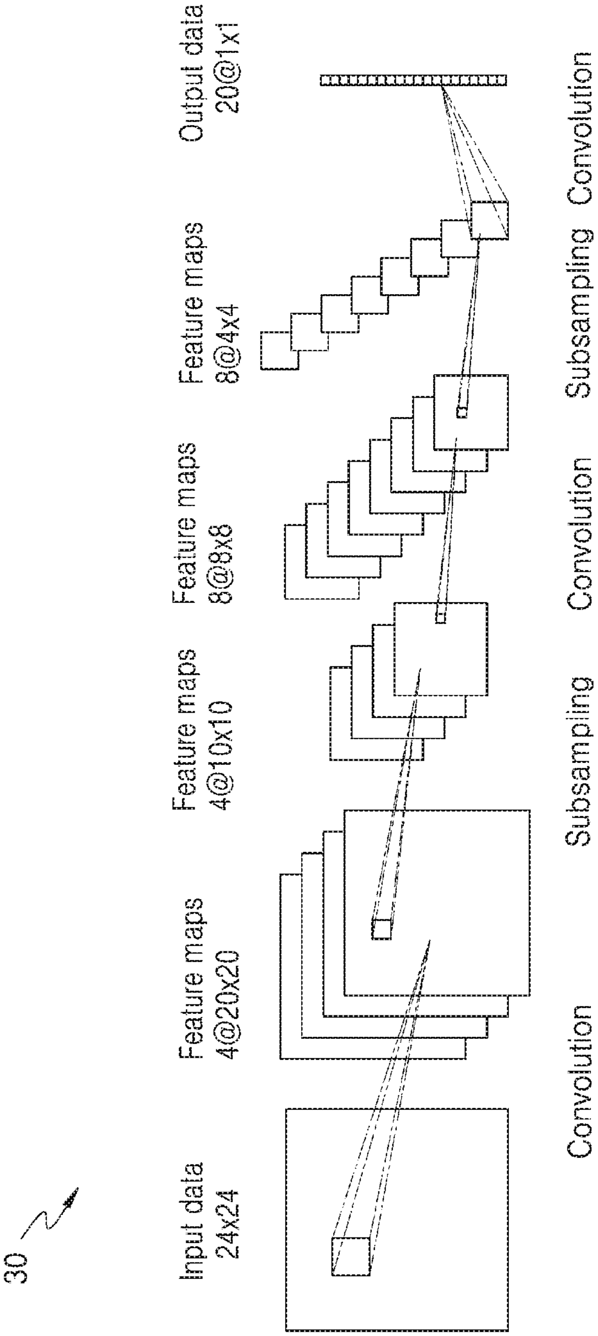
FIG. 3 illustrates an architecture of a neural network according to one or more embodiments.

FIG. 3 illustrates an architecture of a neural network (e.g., a neural network 30) according to one or more embodiments.

Referring to FIG. 3, the neural network 30 may be a deep neural network (DNN) or an p-layer neural network. The DNN or n-layer neural network may correspond to a convolution neural network (CNN), a recurrent neural network (RNN), a deep belief network, or a restricted Boltzmann machine. For example, the neural network 30 may be implemented as a CNN, but is not limited thereto. FIG. 3 illustrates some of convolutional layers included in the CNN corresponding to an example of the neural network 30, but the CNN may further include a pooling layer, a fully-connected layer, or the like in addition to the illustrated convolutional layers.

The neural network 30 may be implemented in an architecture including a plurality of layers including an input data layer, feature map generating layers, and an output data layer. In the neural network 30, when a convolution operation is performed on the input data with a kernel, output feature maps (or activation maps or convolved features) may be generated. Then, a convolution operation with a kernel may be performed on the generated output feature maps as input feature maps of a next layer, and thus new output feature maps may be generated as a result of such convolution operation. When such a convolution operation is repeatedly performed with respective kernels, an identification result for features of input data may be finally output via the neural network 30.

For example, when an image of a 24×24 pixel size is input to the neural network 30 of FIG. 3, feature maps of 4 channels having a 20×20 size may be output via a first convolution operation on the input image with a first kernel. Then, the respectively output feature maps may be incrementally reduced in size via respective convolution operations performed dependent on the output 20×20 feature maps with respective kernels, with a final illustrated convolution operation with a final kernel generating the illustrated final feature maps of a 1×1 size. The neural network 30 may respectively perform the convolution operations and subsampling (or pooling) operations in several layers and output robust features capable of representing an entire image from an input image, and may derive an identification result of the input image via output final features.

Figure 4:
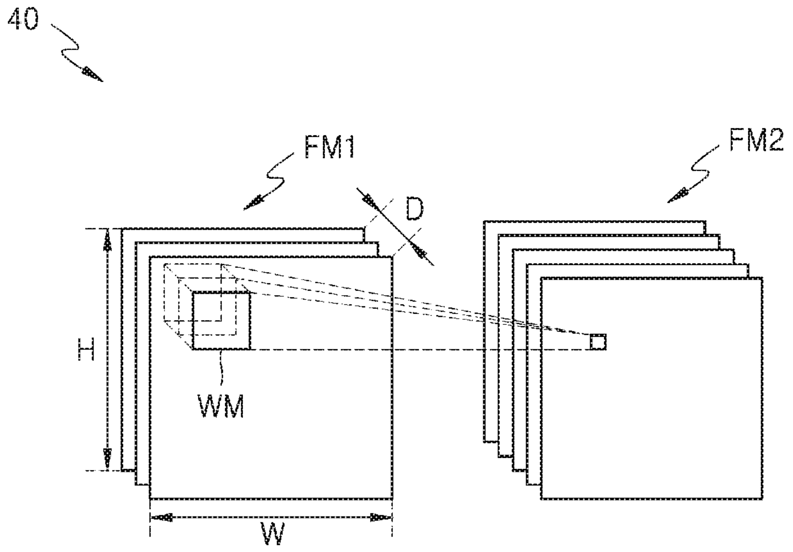
FIG. 4 illustrates a relationship between an input feature map and an output feature map in a neural network according to one or more embodiments.

FIG. 4 illustrates a relationship between an input feature map and an output feature map in a neural network according to one or more embodiments.

Referring to FIG. 4, with respect to a layer 40 of the neural network, a first feature map FM1 may correspond to the input feature map and a second feature map FM2 may correspond to the output feature map. For example, the first feature map FM1 may denote a data set representing various features of input data, and the second feature map FM2 may denote a data set representing various features of output data resulting from convolution operations being performed by applying the weight to the first feature map FM1. The first and second feature maps FM1 and FM2 may include 2D matrix elements or 3D matrix elements, and a pixel value may be defined for each element. The first and second feature maps FM1 and FM2 have a width W (or a column), a height H (or a row), and a depth D. Here, the depth D may correspond to the number of channels.

Thus, the second feature map FM2 may be generated as a result of performing a convolution operation on the first feature map FM1 and a kernel. The kernel kernels features of the first feature map FM1 by performing the convolution operation with the first feature map FM1 with the weight defined in each element. The kernel performs the convolution operation with windows (or also called tiles) of the first feature map FM1 while shifting the first feature map FM1 via a sliding window method. During each shift, each of weights included in the kernel may be multiplied and added to each of pixel values of an overlapping window in the first feature map FM1. A stride may correspond to the number of pixels by which the kernel slides between shifts. When the convolution operation is performed on the first feature map FM1 and the kernel, one channel of the second feature map FM2 may be generated. FIG. 4 illustrates one kernel, but a plurality of kernels may be convolved with the first feature maps FM1 respectively to form the second feature maps FM2 of a plurality of channels.

The second feature map FM2 may also thus correspond to an input feature map of a next layer. For example, the second feature map FM2 may be an input feature map of a subsequent pooling (or subsampling) layer.

In FIGS. 3 and 4, only a schematic architecture of the neural network 30 is illustrated for convenience of description. However, as will be understood after an understanding of the disclosure of this application, examples of the neural network 30 may include a greater or less number of layers, feature maps, and kernels, and sizes thereof may vary.

A typical CNN may implement many multiply and accumulate (MAC) operations. For example, the typical CNN may include tens to hundreds of layers or more, and a large number of MAC operations need to be performed to generate output data via the CNN. Accordingly, to solve such technological problem, the neuromorphic apparatuses and methods of one or more embodiments may implement a lighting technology to reduce an amount of operations performed when implementing a CNN.

A typical lighting technologies may include pruning that removes a neuron or connection having a small effect on final output data and/or weight matrix decomposition that replaces a weight matrix of each layer by multiplication of a plurality of small matrices. Also, other typical lighting technologies may include quantized neural networks, ternary neural networks, and/or binary neural networks, which reduce bit-precision of a parameter (for example, a weight or activation) of each layer. However, such typical lighting technologies tend to decrease an accuracy of the final output data of the CNN.

Also, back-propagation may be used as a training method of a typical neural network. However, according to the back-propagation, the closer to an initial layer of the neural network, the closer a gradient is to 0 (i.e., gradient vanishing). An effect of training of the neural network is low in that updating of a weight according to the back-propagation depends on the gradient.

In contrast, a neural network according to one or more embodiments may have a lower amount of operations and a higher learning effect than such typical neural networks. For example, the neural network according to one or more embodiments may perform unsupervised learning according to a self-organizing map for at least one layer. Accordingly, the neural network according to one or more embodiments may prevent gradient vanishing caused by back-propagation and increase an effect of training (e.g., increase an accuracy of the trained neural network). Also, at least one layer of the trained neural network according to one or more embodiments may generate output feature map data based on the self-organizing map. Thus, the neural network according to one or more embodiments may generate the output feature map data via addition and subtraction instead of a MAC operation, and thus an amount of operations is greatly reduced. Therefore, the neural network according to one or more embodiments may advantageously increase an accuracy thereof and may greatly reduce a number of operations performed in implementing the neural network, thereby improving the technical fields of neural networks and computers implementing such neural networks.

Hereinafter, examples of a neural network and a neuromorphic apparatus for implementing the neural network, according to embodiments, will be described with reference to FIGS. 5 through 12.

Figure 5:
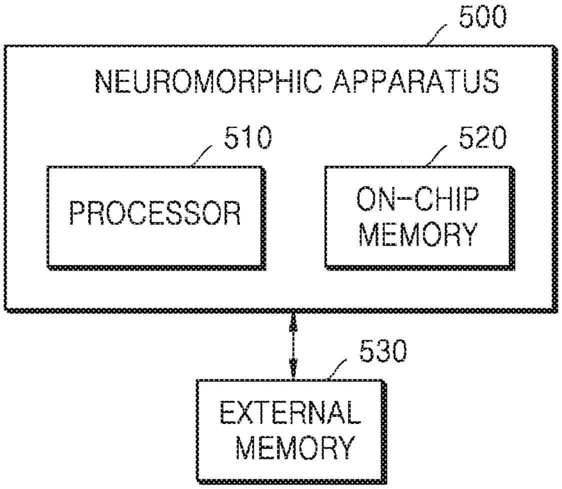
FIG. 5 illustrates a neuromorphic apparatus according to one or more embodiments.

FIG. 5 illustrates a neuromorphic apparatus (e.g., a neuromorphic apparatus 500) according to one or more embodiments.

Referring to FIG. 5, the neuromorphic apparatus 500 may include a processor 510 (e.g., one or more processors) and an on-chip memory 520 (e.g., one or more memories). FIG. 5 shows components of the neuromorphic apparatus 500 related to the current embodiment. Thus, it will be understood, with an understanding of the present disclosure, that the neuromorphic apparatus 500 may further include other components in addition to the components shown in FIG. 5.

Principles of the neuromorphic apparatus 500 may be as described above with reference to FIGS. 1 and 2. Thus, descriptions given with reference to FIGS. 1 and 2 may be applied to the neuromorphic apparatus 500 of FIG. 5. For example, the neuromorphic apparatus 500 may include the configuration 20 and may implement and include a neural network including the neural network node model 11.

The neuromorphic apparatus 500 may be, or may be included in, a digital system with low-power neural network driving, such as a smart phone, a drone, a tablet device, an augmented reality (AR) device, an Internet of things (IoT) device, an autonomous vehicle, robotics, or a medical device, but is not limited thereto.

The neuromorphic apparatus 500 may include a plurality of on-chip memories 520, and each on-chip memory 520 may include a plurality of cores. The core may include a plurality of pre-synaptic neurons, a plurality of post-synaptic neurons, and synapses, i.e., memory cells, providing connections between the plurality of pre-synaptic neurons and the plurality of post-synaptic neurons. According to an embodiment, the core may be implemented as resistive crossbar memory arrays (RCA).

An external memory 530 may be hardware storing various types of data processed by the neuromorphic apparatus 500, and may store data processed or to be processed by the neuromorphic apparatus 500. Also, the external memory 530 may store applications, drivers, and the like to be driven by the neuromorphic apparatus 500. The external memory 530 may include random access memory (RAM) such as dynamic random access memory (DRAM) or static random access memory (SRAM), read-only memory (ROM), electrically erasable programmable read-only memory (EEPROM), a CD-ROM, Blu-ray or another optical disk storage, a hard disk drive (HDD), a solid state drive (SSD), and/or flash memory.

The processor 510 may control all functions for driving the neuromorphic apparatus 500. For example, the processor 510 may execute programs stored in the on-chip memory 520 of the neuromorphic apparatus 500 to control the neuromorphic apparatus 500 in general. The processor 510 may be implemented with an array of a plurality of logic gates, or a combination of a general-purpose microprocessor and a memory storing a program executable by the general-purpose microprocessor. Also, it will be understood, with an understanding of the present disclosure, that the processor 510 may be implemented with another type of hardware.

The processor 510 may be implemented as a central processing unit (CPU), a graphics processing unit (GPU), and/or an application processor (AP) included in the neuromorphic apparatus 500, but is not limited thereto. The processor 510 may read/write various types of data from/to the external memory 530 and execute the neuromorphic apparatus 500 by using the read/written data.

Hereinafter, examples in which the processor 510 operates will be described in detail with reference to FIGS. 6 through 12.

Figure 6:
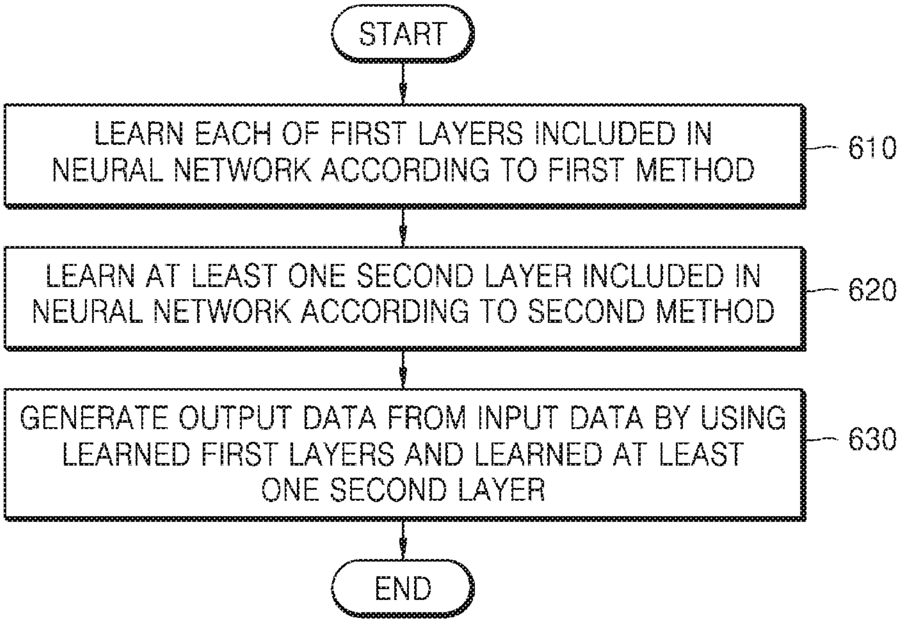
FIG. 6 illustrates a method of implementing a neural network, according to one or more embodiments.

FIG. 6 illustrates a method of implementing a neural network, according to one or more embodiments.

Referring to FIG. 6, the method of implementing a neural network may include operations processed in a time series by the processor 510 of FIG. 5. Thus, descriptions given above with reference to the processor 510 of FIG. 5 may apply to the method of FIG. 6.

In operation 610, the processor 510 may learn or train each of first layers included in the neural network according to a first method.

The neural network according to an embodiment includes a plurality of layers, and the plurality of layers may include first layers and second layers. The processor 510 may learn the first layers and the second layers via different methods. For example, the processor 510 may learn the first layers according to a first method and learn the second layers according to a second method.

Hereinafter, an example of a neural network (e.g., the neural network of FIG. 6) according to an embodiment will be described with reference to FIG. 7.

Figure 7:
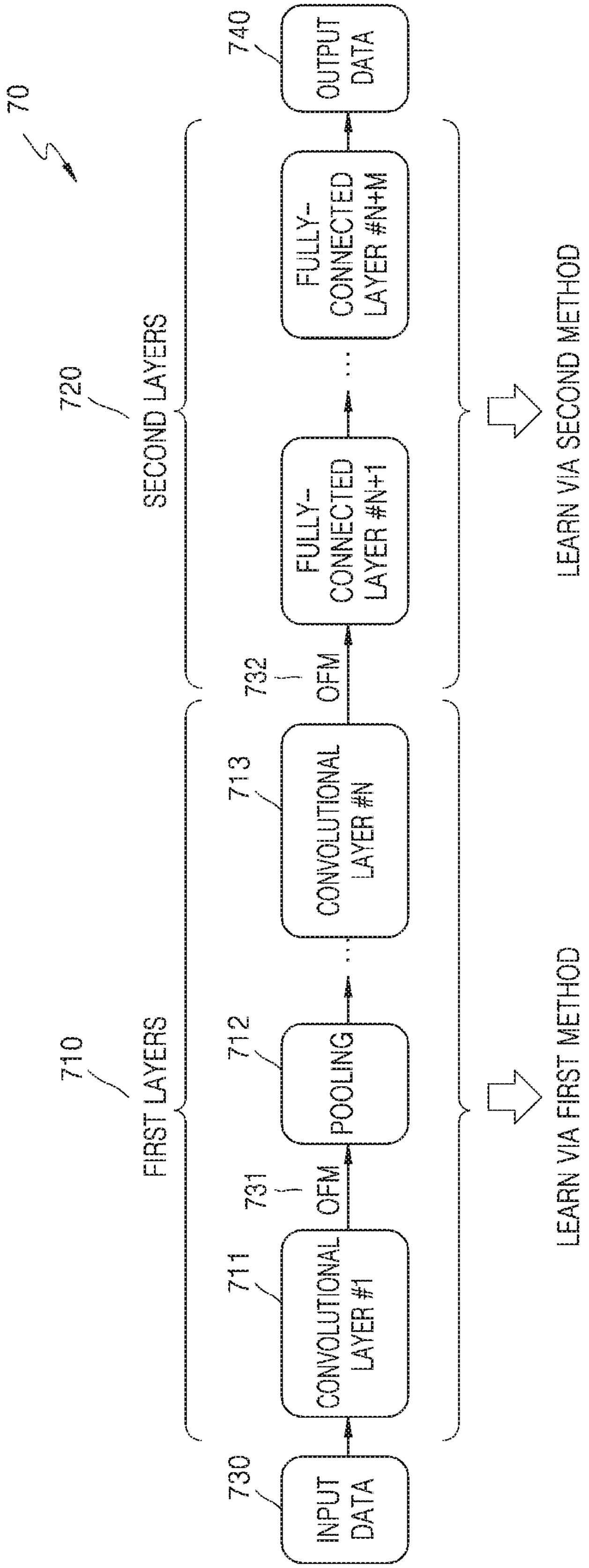
FIG. 7 illustrates a neural network according to one or more embodiments.

FIG. 7 illustrates a neural network (e.g., a neural network 70) according to one or more embodiments.

Referring to FIG. 7, the neural network 70 may include first layers 710 and at least one second layer 720. For example, the first layers 710 may be convolutional layers and the second layer 720 may be a fully-connected layer, but are not limited thereto. The at least one second layer 720 may be located at a rear or output end of the first layers 710.

For example, the first layers 710 may be layers extracting features from input data 730, and the second layers 720 may be layers performing classification and identification based on output feature map data 732 extracted from the input data 730 by the first layers 710.

In an example, the neural network 70 may include the first layers 710 but not the second layer 720. In the example where the neural network 70 does not include the second layer 720, learning according to the second method described below may be omitted.

The input data 730 may be input to the neural network 70 and output data 740 may be finally generated based thereon. Also, pieces of output feature map data 731 and 732 may be generated respectively according to the first and second layers 710 and 720 included in the neural network 70. An example of operating the neural network 70 may be as described above with reference to FIGS. 3 and 4. For example, the neural network 70 may include the neural network 30 and/or the layer 40.

The processor 510 may learn each of the first layers 710 according to the first method. For example, the processor 510 may learn an initial layer 711 included in the first layers 710 by using the input data 730. Then, when the initial layer 711 is learned, the processor 510 may learn a next layer of the first layers 710 by using the output feature map data 731 of the learned initial layer 711. As such, the processor 510 may learn the first layers 710. In an example, a pooling layer 712 may be further provided between layers included in the first layers 710, and the pooling layer 712 may manipulate the output feature map data 731 according to a certain standard. Also, when the pooling layer 712 is provided, the layers included in the first layers 710 and the pooling layer 712 may be connected in series or in parallel.

The first method may include a method corresponding to unsupervised learning. For example, the processor 510 may learn the first layers 710 according to a self-organizing map, but is not limited thereto. Here, the unsupervised learning may denote a method of performing learning based on an input pattern without a target pattern. In other words, the unsupervised learning may denote learning performed based on input data provided as training data, without output data being provided as training data.

The self-organizing map may be one of neural network models used for data clustering and realization of a result of the data clustering. The self-organizing map may include an input layer including the same number of neurons (i.e., nodes) as dimensions of the input data and an output layer including the same number of neurons as clustering target classes. Here, each of the neurons of the output layer may have a weight represented in a vector of a same dimension as the input data, and clustering may be performed by classifying input data into a most similar neuron of the output data by calculating the similarity between the input data and the weight of each neuron. Here, the neurons of the output layer may be arranged in a 1D, 2D, or 3D structure. Also, during a learning process, not only a value of the weight of the neuron may be updated, but also similar neurons may be adjacently arranged. Such a characteristic of the output layer (i.e., a characteristic of the similar neurons being adjacently arranged) is effective in realization of a clustering result.

Example methods by which the processor 510 may learn each of the first layers 710 will be described below with reference to FIGS. 8 through 11.

The processor 510 may learn the at least one second layer 720 according to the second method. For example, the processor 510 may learn the second layer 720 by using the output feature map data 732 of a final layer 713 included in the first layers 710.

The second method may include a method corresponding to supervised learning. For example, the processor 510 may learn the second layer 720 according to a back-propagation method, but is not limited thereto. Here, the supervised learning may denote learning performed based on input data and corresponding output data provided as training data.

Example methods by which the processor 510 may learn the at least one second layer 720 will be described below with reference to FIG. 12.

The processor 510 may learn the neural network 70 by using a plurality of methods to increase an effect of learning the neural network 70. For example, the processor 510 may learn the first layers 710 of the neural network 70 according to the unsupervised learning, thereby preventing an issue (i.e., gradient vanishing) of learning via the back-propagation method.

Also, the neural network 70 may include the first layers 710 learned based on the self-organizing map. Here, output feature map data of each of the first layers 710 may be generated without a MAC operation. Thus, an increase in an amount of operations in a typical convolutional layer due to performing a MAC operation may be prevented.

Referring back to FIG. 6, in operation 620, the processor 510 may learn at least one second layer included in the neural network according to the second method.

The processor 510 may learn the at least one second layer 720 by using the output feature map data 732 of the final layer 713 included in the first layers 710 of the neural network 70. For example, the processor 510 may learn the at least one second layer 720 according to the back-propagation method, but is not limited thereto.

In operation 630, the processor 510 may generate output data from input data by using the learned first layers and the learned at least one second layer.

For example, the processor 510 may generate the output feature map data 732 by applying the input data 730 to the learned first layers 710. Then, the processor 510 may generate the output data 740 by applying the output feature map data 732 to the learned at least one second layer 720.

Figure 8:
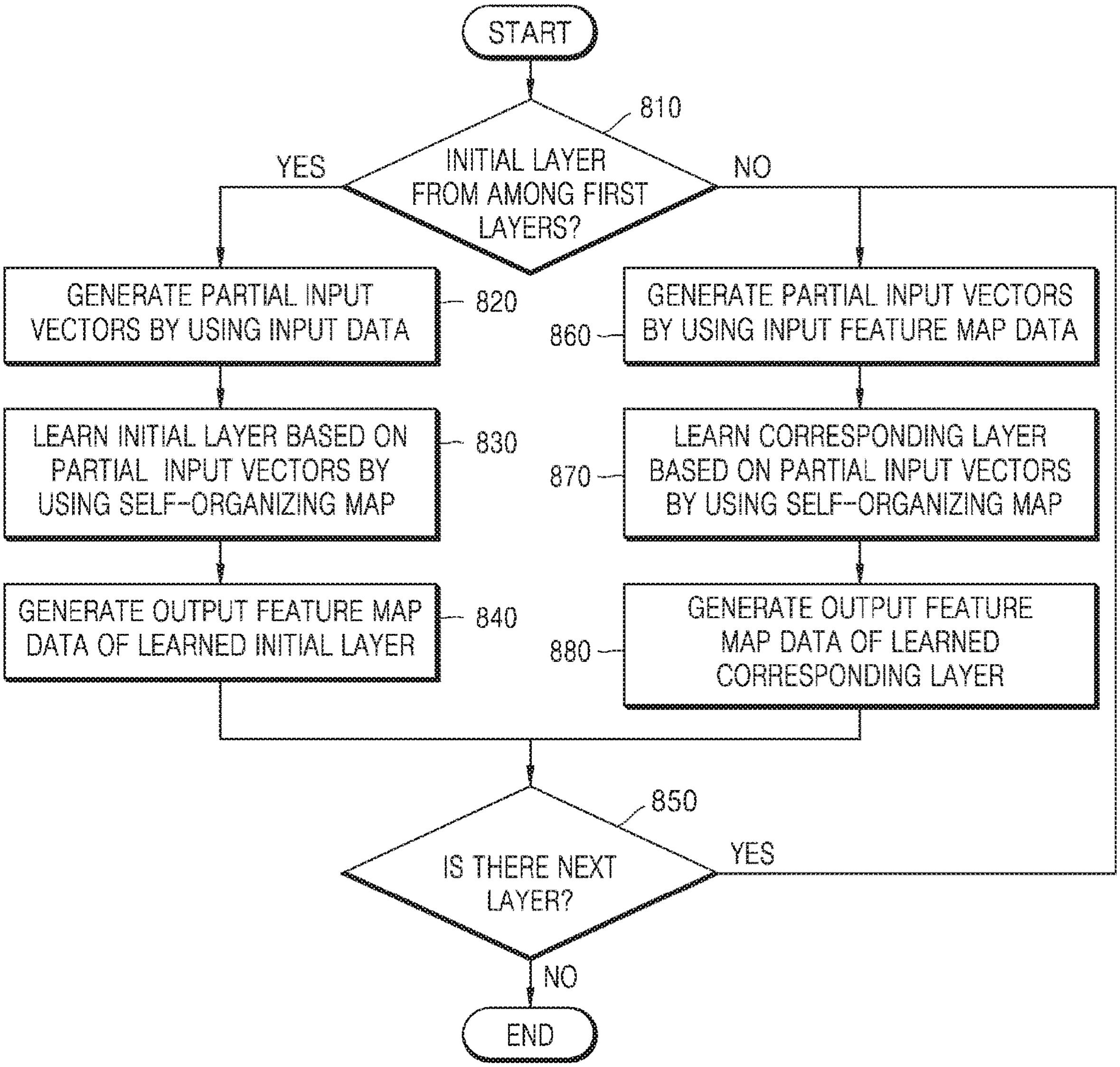
FIG. 8 illustrates a method of a processor learning first layers, according to one or more embodiments.

FIG. 8 illustrates a method of processor (e.g., the processor 510) learning first layers (e.g., the first layers 710), according to one or more embodiments.

Referring to FIG. 8, the processor 510 may sequentially and independently learn the first layers 710. For example, when the first layers 710 include L layers, wherein L is a natural number, the processor 510 may independently learn the L layers in an order from the initial layer 711 to the final layer 713, i.e., an Lth layer.

In operation 810, the processor 510 may determine whether a current layer is the initial layer 711 from among the first layers 710. When the current layer is the initial layer 711, operation 820 may performed and when not, operation 860 may be performed.

In operation 820, the processor 510 may generate partial input vectors by using the input data 730 of the initial layer 711. Here, the input data 730 may denote data that is initially input to the neural network 70 and is used for training of the first layers 710. Referring to FIG. 7, as described above, the neural network 70 may be configured in an order from the first layers 710 to the second layers 720. Accordingly, the processor 510 may learn the initial layer 711 by using the input data 730. Hereinafter, examples of the processor 510 generating the partial input vectors will be described with reference to FIGS. 9A and 9B.

Figure 9A:
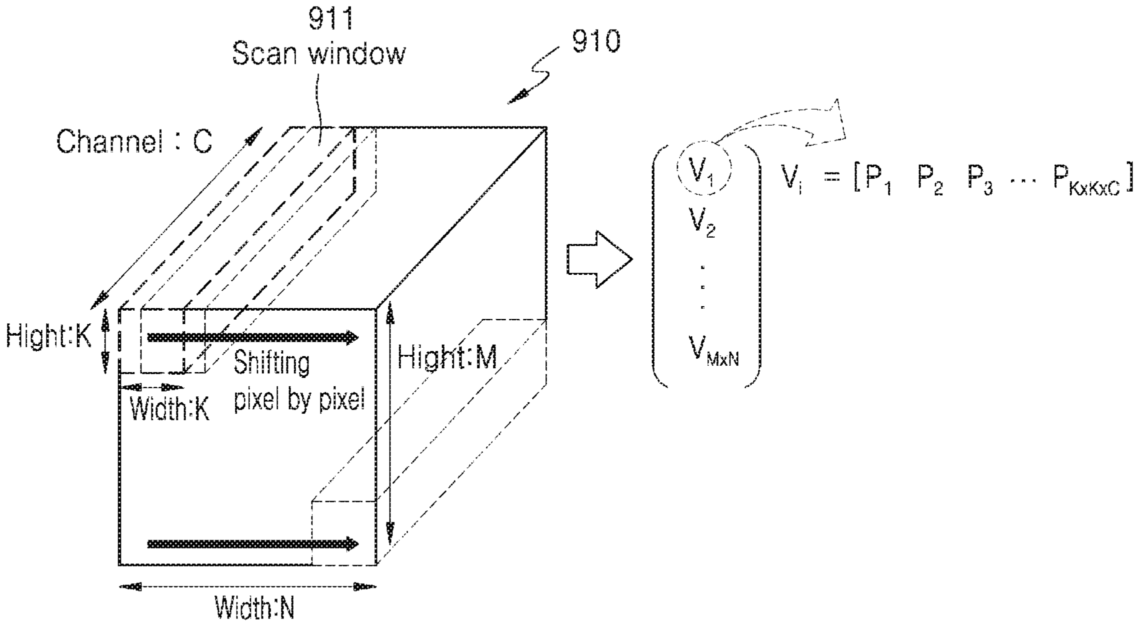
FIGS. 9A and 9B illustrate examples of a processor generating partial input vectors, according to one or more embodiments.
Figure 9B:
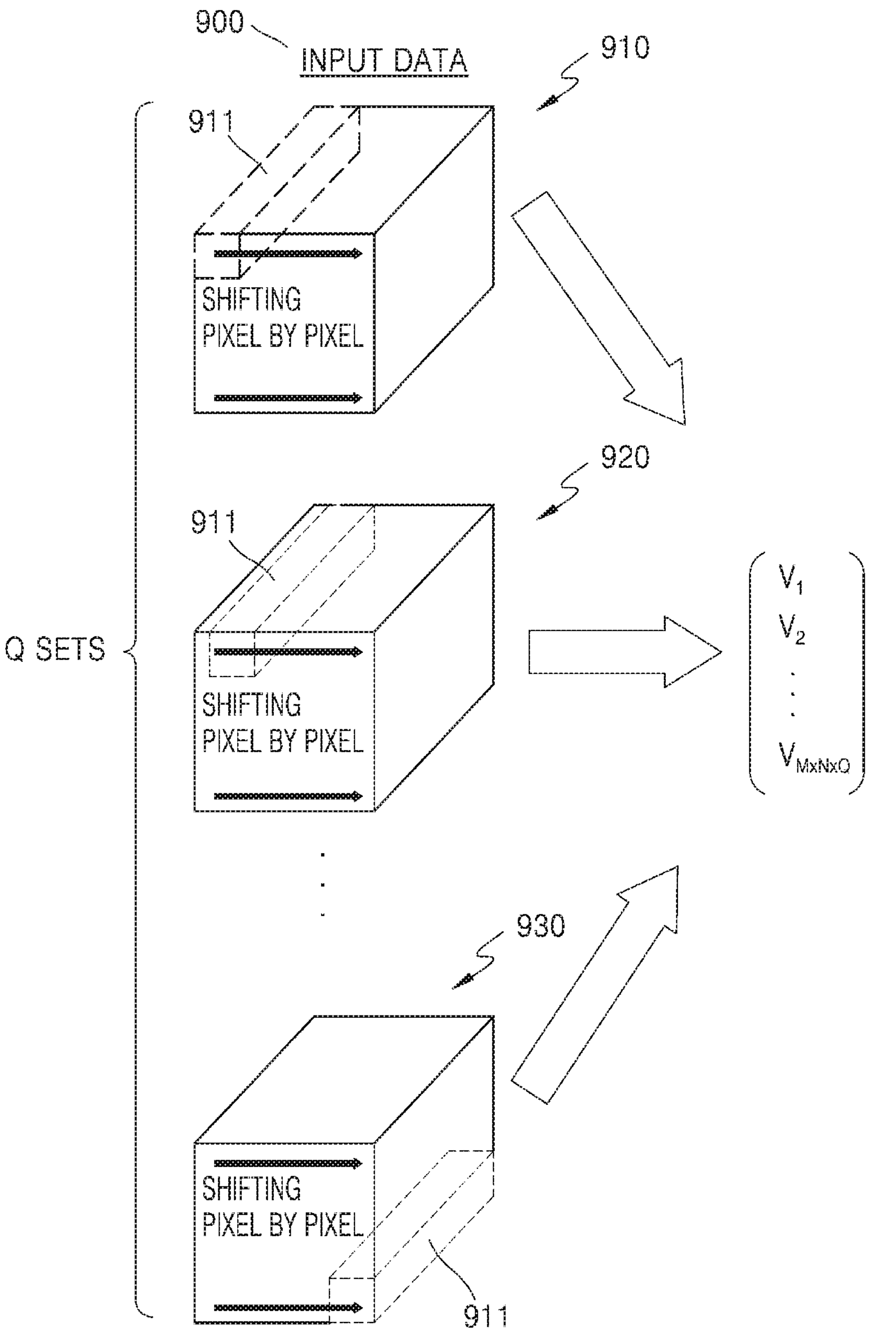

FIGS. 9A and 9B illustrate a processor (e.g., the processor 510) generating partial input vectors (e.g., the partial input vectors of FIG. 8), according to one or more embodiments.

FIG. 9A illustrates a first set 910 (e.g., a feature map such as feature map FM1 of FIG. 4) included in input data 900 and FIG. 9B illustrates all sets 910 through 930 included in the input data 900. For convenience of description, each of the sets 910 through 930 may have an N×M pixel size and a C channel size, wherein N, M, and C are each a natural number. Also, the input data 730 may include total Q sets 910 through 930, wherein Q is a natural number.

Referring to FIG. 9A, the processor 510 may scan the first set 910 while moving a scan window 911 up, down, left, and right by one pixel (e.g., by a single pixel stride value). Here, the scan window 911 may have a K×K pixel size and a C channel size, wherein K is a natural number.

Accordingly, a total of K×K×C pixels may be included in each scan region and values stored in the K×K×C pixels are elements of a partial input vector. In other words, the processor 510 may generate a partial input vector including K×K×C elements $P_1$ through $P_{K\times K\times C}$.

The processor 510 may generate the partial input vector of a K×K×C dimension for each scan region included in the first set 910. Accordingly, when the processor 510 scans an entire region of the first set 910 by using the scan window 911, M×N partial input vectors $V_1$ through $V_{M\times N}$ in total may be generated.

Referring to FIG. 9B, the input data 900 may include Q sets 910 through 930 in total. Accordingly, when the processor 510 scans the input data 900 by using the scan window 911, the processor 510 may generate M×N×Q partial input vectors $V_1$ through $V_{M\times N\times Q}$ in total.

Example processes by which the processor 510 may generate partial input vectors of a next layer as will be described below with reference to operation 860 may be the same as that described above with reference to FIGS. 9A and 9B.

Referring back to FIG. 8, in operation 830, the processor 510 may learn the initial layer 711 based on the partial input vectors by using a self-organizing map.

The processor 510 may cluster the partial input vectors via the self-organizing map. For example, for a partial input vector, the processor 510 may search for an output neuron of the self-organizing map having a most similar weight as the partial input vector. Then, the processor 510 may update a weight of at least one neuron located in a certain range based on a found output neuron having the most similar weight.

Hereinafter, an example of the processor 510 learning the initial layer 711 will be described with reference to FIG. 10.

Figure 10:
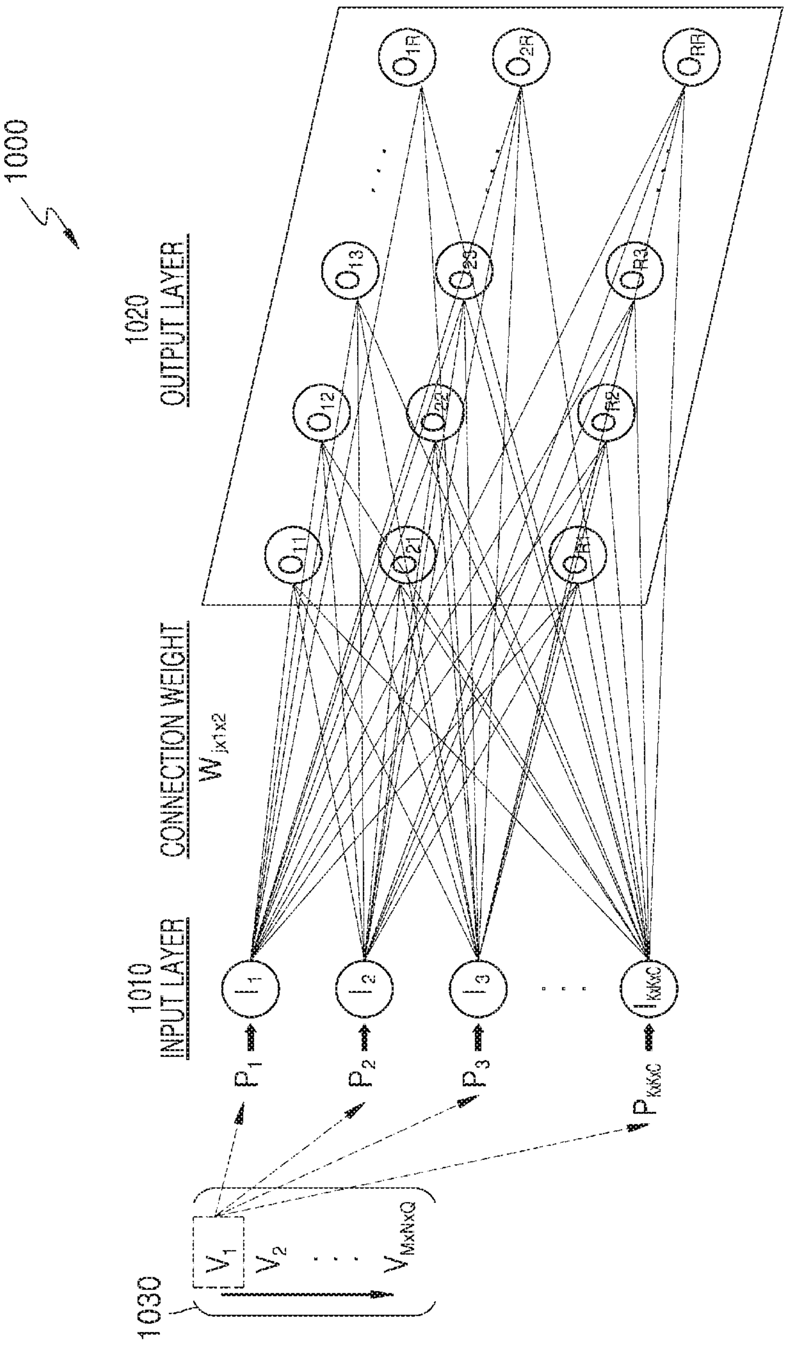
FIG. 10 illustrates a processor learning an initial layer, according to one or more embodiments.

FIG. 10 illustrates a processor (e.g., the processor 510) learning an initial layer (e.g., the initial layer 711), according to one or more embodiments.

FIG. 10 illustrates a structure of a self-organizing map 1000 for learning of an initial layer. For example, the self-organizing map 1000 may include an input layer 1010 and an output layer 1020, and the input layer 1010 may include a same number of input nodes $I_1$ through $I_{K\times K\times C}$ as dimensions of partial input vectors 1030.

Also, the output layer 1020 may include a same number of output neurons $O_{11}$ through $O_{RR}$ as a number of clustering target classes. In FIG. 10, the number of clustering target classes is shown to be RR for convenience of description, but is not limited thereto. Each of the output neurons $O_{11}$ through $O_{RR}$ may perform a same operation as a single kernel of a convolutional layer.

Also, each of the output neurons $O_{11}$ through $O_{RR}$ may include all the input nodes I, through $I_{K\times K\times C}$ and a connection weight $W_{j:r1r2}$.

The processor 510 may search for and find an output neuron of the output layer 1020 having a most similar weight as one of the partial input vectors 1030. Also, the processor 510 may learn an initial layer (e.g., the initial layer 711) by updating a weight of at least one output neuron located in a certain range based on the found output neuron. For example, the processor 510 may input M×N×Q partial input vectors $V_i$ included in the partial input vectors 1030 to the self-organizing map 1000 one by one, thereby learning the initial layer such that the partial input vectors 1030 are clustered. For example, the processor 510 may learn the initial layer according to Equations 1 through 6 below.

First, the processor 510 may calculate the similarity between a connection weight of a self-organizing map (e.g., the self-organizing map 1000) and a partial input vector (e.g., the partial input vectors 1030) according to Equation 1 below, for example.

$$E_{r1r2} = |V_i - W_{r1r2}| = \sum_{r2=1}^{R}\sum_{r1=1}^{R}\sum_{j=1}^{K\times K\times C}\left|P_j - W_{j:r1r2}\right| \quad \text{Equation 1}$$

In Equation 1, $E_{r1r2}$ denotes similarity between a partial input vector $V_i$ and a connection weight $W_{rir2}$. Here, $V_i$ denotes one of the partial input vectors 1030. According to the examples of FIGS. 9A and 9B, $V_i=[P_1, P_2, P_3, \ldots, P_{K\times K\times C}]$ (here, $i\in\{1, 2, \ldots, M\times N\}$). Also, $W_{rir2}$ denotes a connection weight $W_{j:r1r2}$ of the self-organizing map 1000. According to the example of FIG. 10, $Wr1r2=[W_{1:r1r2}, W_{2:r1r2}, W_{3:r1r2}, \ldots, W_{K\times K\times C:r1r2}]$ (Here, r1 and $r2\in\{1, 2, \ldots, R\}$).

When the similarity $E_{r1r2}$ is calculated according to Equation 1, the processor 510 may calculate coordinates ($win_1$, $win_2$) of an output neuron (e.g., of the output layer 1020) most similar to the partial input vector according to Equation 2 below, for example.

$$(win_1, win_2) = \underset{r1,r2}{\operatorname{argmin}}\, E_{r1r2} \quad \text{Equation 2}$$

According to Equations 1 and 2 above, the processor 510 may search for and find the output neuron having the most similar weight as the partial input vector.

Then, the processor 510 may update a weight of at least one output neuron located in a certain range based on the found output neuron, according to Equations 3 through 6 below, for example.

For example, the processor 510 may update at least one of the output neurons $O_{11}$ through $O_{RR}$ such that the output layer 1020 is further similar to the partial input vector, according to Equation 3 below, for example.

$$W_{new} = W_{old} + \partial(t)L(t)(V_i - W_{r1r2}) \quad \text{Equation 3}$$

In Equation 3, $W_{new}$ denotes an updated value of an output neuron and $W_{old}$ denotes a value of an output neuron before being updated. Also, L(t) denotes a learning coefficient and may be calculated according to Equation 4 below, for example.

$$L(t) = L_0 \exp\left(-\frac{t}{\gamma}\right) \quad \text{Equation 4}$$

In Equation 4, L(t) denotes a learning rate. Here, the learning rate denotes an amount by which a weight value is updated. Also, t denotes the number of times learning is repeated and $\gamma$ is a constant indicating a degree to which the learning rate is reduced as the learning is repeated. Also, $L_0$ denotes an initial value of the learning rate. In other words, according to Equation 4, the learning rate gradually decreases as the learning is repeated.

Also, in Equation 3 above, $\partial(t)$ denotes a range of output neurons of which weights are to be updated from among the output neurons $O_{11}$ through $O_{RR}$, and may be determined according to Equations 5 and 6 below, for example.

$$\partial(t) = \exp\left(-\frac{\sqrt{|(\text{win}_1, \text{win}_2) - (r1, r2)|^2}}{\sigma(t)}\right) \quad \text{Equation 5}$$

$$\sigma(t) = \sigma_0 \exp\left(-\frac{t}{\gamma}\right) \quad \text{Equation 6}$$

In Equation 6, t denotes the number of times learning is repeated and $\gamma$ is a constant indicating a degree to which a range of updating a weight value is reduced as the learning is repeated. Also, $\sigma_0$ denotes an initial value of the range of updating the weight value. In other words, according to Equation 6, a range calculated according to Equation 5 (i.e., a range of output neurons of which weights are to be updated) gradually reduces as learning is repeated.

According to Equations 3 through 6 above, the output neurons $O_{11}$ through $O_{RR}$ having similar properties may be adjacently arranged.

The output neurons $O_{11}$ through $O_{RR}$ of which learning is completed according to Equations 1 through 6 above have the connection weight $W_{j:r1r2}$ corresponding to a main pattern of the partial input vector 1030, and output neurons corresponding to a similar pattern are adjacently arranged. Accordingly, the processor 510 completes the learning of the initial layer 711.

A process by which the processor 510 learns a next layer described below with reference to operation 870 may be the same as that described above with reference to FIG. 10.

Referring back to FIG. 8, the processor 510 may generate the output feature map data 731 of the learned initial layer 711, in operation 840.

The processor 510 may generate partial input data by using the input data 730. Here, the input data 730 may denote data that is initially input to the neural network 70 and for generating the output feature map data 731. Also, the processor 510 may generate the output feature map 731 by calculating the similarity between the partial input vectors and the updated weight. Hereinafter, an example of the processor 510 generating the output feature map data 731 will be described with reference to FIG. 11.

Figure 11:
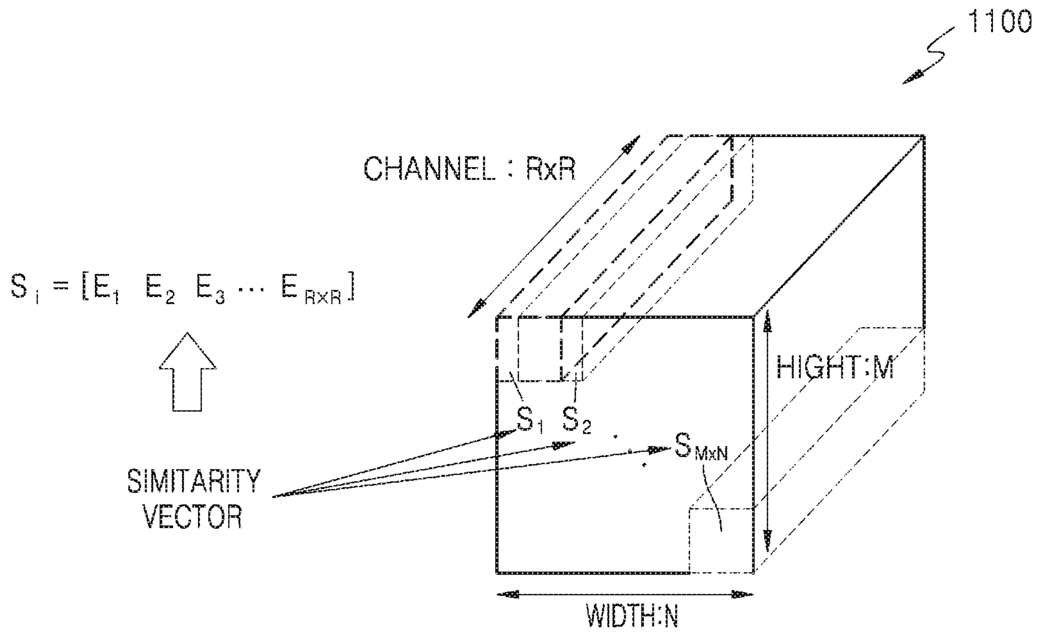
FIG. 11 illustrates a processor generating an output feature map according to one or more embodiments.

FIG. 11 illustrates a processor (e.g., the processor 510) generating an output feature map, according to one or more embodiments.

FIG. 11 illustrates an example of output feature map data 1100. For convenience of description, in an example, input data for generating the output feature map data 1100 of FIG. 11 may be the input data 900 of FIG. 9A.

The processor 510 may generate partial input vectors by using the input data. According to the example of FIG. 9A, the processor 510 may generate the M×N partial input vectors $V_1$ through $V_{M\times N}$ in total.

The processor 510 may calculate the similarity between the partial input vectors $V_1$ through $V_{M\times N}$ and updated connection weights. For example, the processor 510 may calculate the similarity between a partial input vector and an updated connection weight according to Equation 7 below, for example.

$$E_{r1r2} = |V_i - W_{r1r2}| = \sum_{r2=1}^{R}\sum_{r1=1}^{R}\sum_{j=1}^{K\times K\times C}\left|P_j - W_{j:r1r2}\right| \quad \text{Equation 7}$$

In Equation 7, $E_{r1r2}$ denotes similarity between a partial input vector $V_i$ and an updated connection weight $W_{rir2}$. Here, $V_i$ denotes one of the partial input vectors. According to the examples of FIGS. 9A and 9B, $V_i=[P_1, P_2, P_3, \ldots, P_{K\times K\times C}]$ (here, $i \in \{1, 2, \ldots, M\times N\}$). Also, $W_{rir2}$ denotes an updated connection weight $W_{j:r1r2}$. According to the example of FIG. 10, $Wr1r2=[W_{1:r1r2}, W_{2:r1r2}, W_{3:r1r2}, \ldots, W_{K\times K\times C:r1r2}]$ (Here, r1 and $r2 \in \{1, 2, \ldots, R\}$).

According to Equation 7, the processor 510 may calculate the similarity between the partial input vectors $V_1$ through $V_{M\times N}$ and all output neurons of a self-organizing map. Also, the processor 510 may configure a similarity vector $S_i$ indicating the similarity between the partial input vectors $V_1$ through $V_{M\times N}$ and updated output neurons as $S_i=[E_{11}, E_{12}, \ldots, E_{1R}, E_{21}, E_{22}, \ldots, E_{RR}]$.

When each partial input vector passes through a self-organizing map, the similarity vector $S_i$ of R×R dimensions equal to the number of output neurons may be generated. The processor 510 may determine the similarity vector $S_i$ as partial output feature map data $S_1$ having R×R channels and a 1×1 pixel size.

According to the above-described processes, the processor 510 may generate pieces of output feature map data $S_1$ through $S_{M\times N}$ identically from all partial input vectors and matches the pieces of output feature map data $S_1$ through $S_{MZN}$ with coordinates of input data of which a partial input vector is generated. Accordingly, the processor 510 may generate the output feature map data 1100 having R×R channels and M×N pixel size. The output feature map data 1100 may be used as input feature map data of a next layer.

A process by which the processor 510 generates output feature map data of a next layer described below with reference to operation 880 may be the same as that described with reference to FIG. 11.

Referring back to FIG. 8, in operation 850, the processor 510 may determine whether there is a next layer after the first layers 710. Here, the next layer may denote a layer that is yet to be learned from among the first layers 710. When there is a next layer, operation 860 may be performed and when there is not a next layer, the learning of the first layers 710 may be ended or completed.

In operations 860 through 880, the processor 510 may learn the next layer. In other words, the processor 510 may learn a next layer of a layer of which learning is completed (i.e., a layer using output feature map data of a layer of which learning is completed as input feature map data).

For example, specific processes of operations 860 through 880 may be the same as those of operations 820 through 840.

As described above with reference to FIGS. 8 through 11, the processor 510 may sequentially and independently learn all layers included in the first layers 710.

As described above with reference to operation 620, the processor 510 may learn the at least one second layer 720 according to the back-propagation method. Hereinafter, an example of the processor 510 learning the at least one second layer 720 will be described with reference to FIG. 12.

Figure 12:
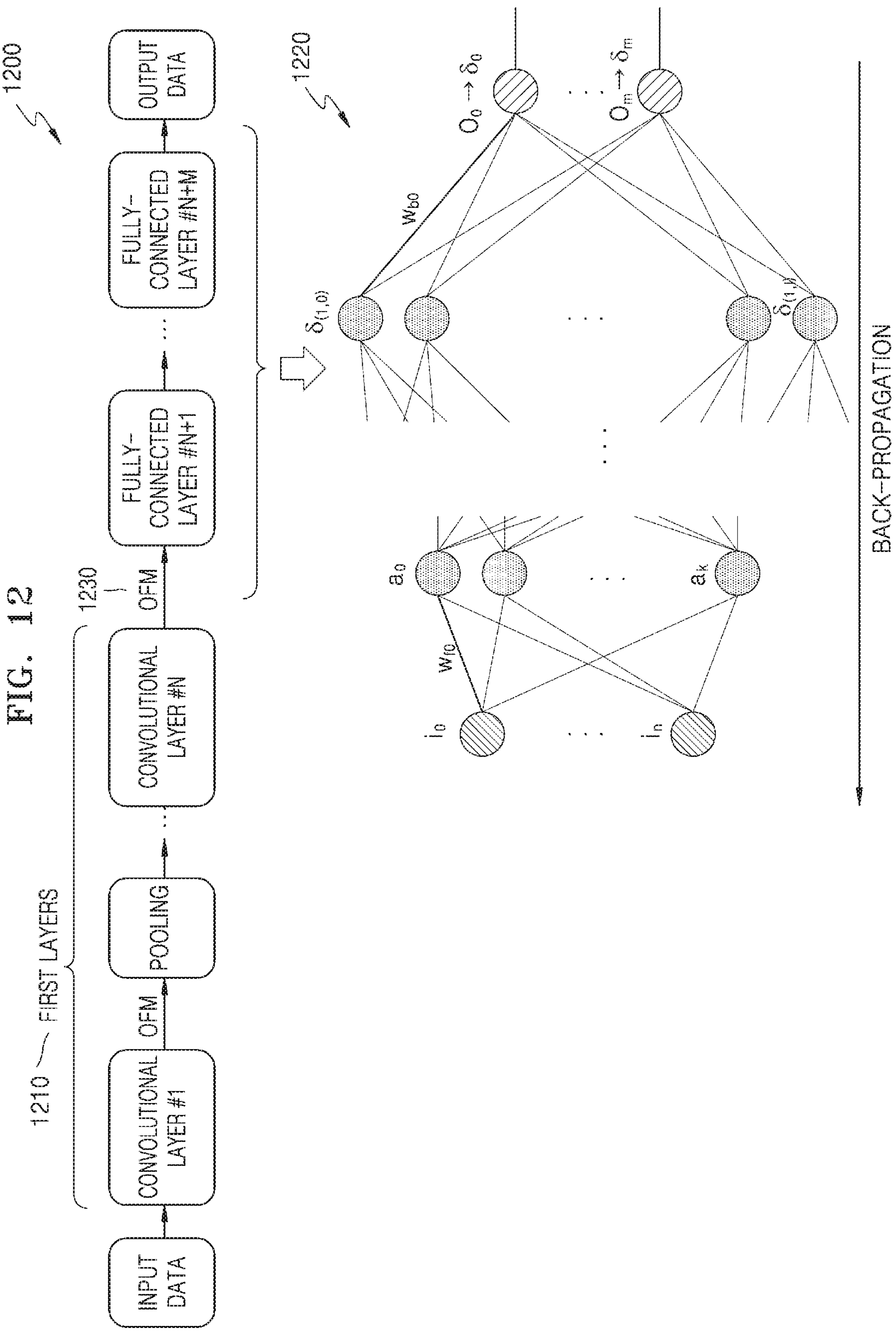
FIG. 12 illustrates a processor learning at least one second layer, according to one or more embodiments.

FIG. 12 illustrates a processor (e.g., the processor 510) learning at least one second layer (e.g., at least one second layer 1220), according to one or more embodiments.

FIG. 12 illustrates an example of the at least one second layer 1220 included in a neural network 1200. The processor 510 may learn the at least one second layer 1220 by using final output feature map data 1230 of first layers 1210.

For example, the processor 510 may learn the at least one second layer 1220 according to a back-propagation method. For convenience of description, the final output feature map data 1230 may include activations $i_0$ through $i_n$. Also, the at least one second layer 1220 may include a plurality of layers and activations $o_0$ through $o_m$ are output through the second layers 1220.

After the activations $o_0$ through $o_m$ are generated, the activations $o_0$ through $o_m$ may be compared with expected results and an error δ may be generated. For example, the error δ may be differences between the expected results and the activations $o_0$ through $o_m$, and the training of the neural network 1200 may be performed such that the error δ is decreased.

To reduce the error δ, activations used for pre-performed intermediate operations may be updated as final errors $\delta_0$ through $\delta_m$ are propagated in a direction opposite to forward propagation (i.e., back-propagation). For example, intermediate errors $\delta_{(1,0)}$ through $\delta_{(1,l)}$ may be generated through an operation performed on the final errors $\delta_0$ through $\delta_m$ and weights. The intermediate errors $\delta_{(1,0)}$ through $\delta_{(1,l)}$ are inputs for generating an intermediate error of a next layer and the above-described operations are performed again. Through such processes, the error δ may be propagated in the direction opposite to the forward propagation, and a gradient of activation used to update activations is calculated.

Equation 8 below may be obtained when the processes of back-propagation are summarized in an equation.

$$\Delta I(x, y, z) = \sum_{i=0}^{Fx-1} \sum_{j=0}^{Fy-1} \sum_{k=0}^{Fn-1} \Delta O'(x+i, y+j, k) * F(i, j, z, k) \quad \text{Equation 8}$$

In Equation 8, ΔI(x,y,z) is an output of back-propagation and denotes a gradient of an input activation of a current layer in forward propagation. Also, ΔO(x,y,n) is an input of back-propagation and denotes a gradient of an input activation of a next layer in forward propagation. Here, ΔO'(x,y,n) denotes that zero padding is performed on ΔO(x,y,n). Also, F(x,y,n,z) is a weight of a kernel and denotes a weight of a rearranged kernel of forward propagation. The back-propagation may be ended when a calculation of Equation 8 is repeated Ix×Iy×Iz times.

As described above, when the back-propagation is performed on all of the second layers 1220, a weight may be updated based on a result of the back-propagation. For example, a gradient of weight used to update a weight is calculated by using a gradient of activation calculated according to the back-propagation. Equation 9 may be obtained when updating of a weight is summarized in an equation.

$$\Delta W(x, y, z, n) = \sum_{i=0}^{Ox-1} \sum_{j=0}^{Oy-1} \Delta O'(x+i, y+j, n) * I(i, j, z) \quad \text{Equation 9}$$

In Equation 9, ΔW(x,y,z,n) denotes a gradient of weight and I(x,y,z) denotes an input activation of a current layer. Also, ΔO(x,y,n) denotes a gradient of an output activation of the current layer (i.e., a gradient of an input activation of a next layer). Here, ΔO'(x,y,n) denotes that zero padding is performed on ΔO(x,y,n). The updating of a weight may be ended when a calculation of Equation 9 is repeated Fx×Fy×Fz×Fn times.

The second layers 1220 may be learned or trained via the back-propagation and the updating of a weight.

As described above, the neural network 70 or 1200 and the neuromorphic apparatus 500 implementing the neural network 70 or 1200 according to embodiments have the following advantageous effects.

First, a convolutional layer included in a typical CNN may operate based on a MAC operation between input data and a weight. However, the neural network 70 or 1200 of one or more embodiments may include first layers 710 or 1210 based on a self-organizing map and the first layers 710 or 1210 may operate via addition and subtraction without MAC operation. Accordingly, the neural network 70 or 1200 may have a reduced number of bit-unit operations (i.e., an amount of operations) in digital operation hardware as shown in Table 1 below.

TABLE 1

| Classification | Typical Convolutional Layer | | Each of First Layers 710 and 1210 | |
|---|---|---|---|---|
| Condition | Number of Channels of Input Data | C | Number of Channels of Input Data | C |
| | Bit-Precision indicating Pixel Value of Input Data | N Bits | Bit-Precision indicating Pixel Value of Input Data | N Bits |

TABLE 1-continued

| Classification | Typical Convolutional Layer | | Each of First Layers 710 and 1210 | |
|---|---|---|---|---|
| | Kernel Size | KxK | Size of Scan Window | KxK |
| | Number of Channels of Kernel | F | Number of Output Neurons of Self-organizing map | F |
| | Bit-Precision indicating Kernel Weight | N Bits | Bit-Precision indicating Weight of Output Neuron of Self-organizing map | N Bits |
| Amount of Operations | KxKxCxF Multiplications (KxKxCxFxNxN Bit-Unit AND Operations | | KxKxCxF Subtractions (KxKxCxFxN Bit-Unit OR Operations | |

According to Table 1, conditions (parameters related to a layer) of the typical convolutional layer and the first layers 710 or 1210 may be the same. Here, when bit-precisions of a pixel value of input data and a kernel weight (a weight of an output neuron) are 32 bits, an amount of operations of the first layers 710 or 1210 of one or more embodiments may be reduced by 1/32 times compared to the typical convolutional layer.

The amounts of operations of some models representing the typical CNN may be summarized as Table 2 below.

However, because the neural network 70 or 1200 of one or more embodiments independently and sufficiently trains the first layers 710 or 1210 from the initial layer to the final layer, all layers included in the neural network 70 or 1200 may effectively extract features and perform classification and identification. Accordingly, compared to the typical CNN, the neural network 70 or 1200 may have high accuracy of results.

Also, because the first layers 710 or 1210 of one or more embodiments may be learned or trained according to a

TABLE 2

| Model Name | LeNet 5 | AlexNet | VGG 16 | GoogLeNet v1 | ResNet 50 |
|---|---|---|---|---|---|
| Total Number of MAC Operations of Model | 341k | 724M | 15.5 G | 1.43 G | 3.9 G |
| Total Number of MAC Operations in Convolutional Layer | 283k (83% of Total Number of MAC Operations) | 666K (92% of Total Number of MAC Operations) | 15.3 G (99% of Total Number of MAC Operations) | 1.43 G (99% of Total Number of MAC Operations) | 3.86 G (99% of Total Number of MAC Operations) |
| Total Number of MAC Operations in Fully-connected Layer | 58k | 130M | 124M | 1M | 2M |

According to Table 2, an amount of operations of a convolutional layer in a CNN may occupy about 83 to 99% of a total amount of operations of the CNN. In other words, most of the amount of operations in the CNN may be occupied by the amount of operations of the convolutional layer. As described in Table 1, because the amount of operations of the first layers 710 and 1210 of one or more embodiments may be significantly less than the amount of operations of the typical convolutional layer, the total amount of operations of the neural network 70 or 1200 may be significantly less than the total amount of operations of the typical CNN.

Also, the typical CNN (i.e., a CNN based on a MAC operation) may be essentially accompanied by an operation of an activation function such as an ReLu function, a Sigmoid function, or a tan h function. However, the neural network 70 or 1200 of one or more embodiments may not require an operation of an activation function. Thus, according to the neural network 70 or 1200 of one or more embodiments, not only the amount of operations is additionally reduced, but also dedicated hardware (for example, the neuromorphic apparatus 500) driving the neural network 70 or 1200 is very easily implemented.

Also, the typical CNN may perform training based on a back-propagation method in which weights of layers are updated sequentially from a final layer to an initial layer. In this case, an update amount of a weight may become very small towards the initial layer. Accordingly, in the case of a CNN including tens to hundreds of layers, layers at a front end (i.e., layers near an initial layer) may be barely learned or trained. Thus, the accuracy of classification and identification of a CNN may vary depending on how an initial weight is set.

self-organizing map, output neurons having similar properties may be adjacently arranged. Accordingly, when the neural network 70 or 1200 of one or more embodiments includes a pooling layer, pooling in a channel direction may be enabled. However, pooling in a channel direction may not possible in the typical CNN. Thus, output feature map data of the neural network 70 or 1200 of one or more embodiments may have a further reduced size of data compared to output feature map data of the typical CNN. Accordingly, an overall size of a model of the neural network 70 or 1200 may be reduced.

In addition, because the first layers 710 or 1210 may be trained according to the self-organizing map, even when a weight and output feature map data of the first layers 710 or 1210 are binarized, the accuracy of classification may be excellent compared to the typical CNN. Accordingly, the neural network 70 or 1200 of one or more embodiments may maintain a high level of accuracy of classification while having a reduced amount of operations and a reduced entire size of model.

The array circuits, axon circuits, synapse arrays, neuron circuits, neuromorphic apparatuses, processors, on-chip memories, external memories, axon circuits 210, synapse arrays 220, neuron circuits 230, neuromorphic apparatus 500, processor 510, on-chip memory 520, external memory 530, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented neural network implementation method executed by a processor and an on-chip memory included in a neuromorphic apparatus for performing a neuromorphic operation, the method comprising:

performing, by the processor and the on-chip memory included in the neuromorphic apparatus, a first training of each of first layers included in a convolution neural network based on unsupervised learning according to a self-organizing map without using back-propagation, including determining a similarity between partial input vectors and an updated weight of at least one output neuron using input feature map data stored in the on-chip memory, wherein the self-organizing map comprises an input layer having a number of neurons equal to dimensions of an input and an output layer having a number of neurons equal to clustering target classes, and wherein each neuron of the output layer of the self-organizing map has a weight vector having the same dimension as the input and the input of the self-organizing map is clustered by classifying the input into one of most similar neuron of the output layer based on a calculated similarity between the input and the weight vector of each neuron of the output layer;

performing, by the processor and the on-chip memory, a second training of at least one second layer included in the convolution neural network based on supervised learning according to back-propagation; and performing, by the processor and the on-chip memory, an inference operation, including generating, by the processor and the on-chip memory, output data based on input data stored in the on-chip memory, by using the learned first layers and the learned at least one second layer, wherein the first layers comprise convolutional layers of the convolution neural network to extract features from the input data and the at least one second layer comprises at least one fully-connected layer of the convolution neural network to perform classification and identification based on output feature map data extracted from the input data by the first layers, wherein the convolution neural network is implemented as a single convolution neural network including the first layers and the at least one second layer, wherein the performing the first training comprises generating output feature map data for the convolutional layers via addition operation and subtraction operation instead of a MAC (multiply and accumulate) operation based on the self-organizing map, wherein the generated output feature map data of the first layers is used as an input feature map for the at least one second layer to perform the supervised learning according to the back-propagation, wherein the generating the output feature map data comprises:

generating partial input vectors based on input feature map data of an initial layer of the first layers;

determining the similarity between the partial input vectors and the updated weights, to generate similarity vectors; and generating the output feature map data of the initial layer based on the similarity vectors, and wherein the similarity vectors are determined as partial output feature map data, and the partial output feature map data is matched with a coordinate of the input feature map data of which the partial input vectors are generated, to generate the output feature map data of the initial layer, and wherein the first training, the second training and the inference operation are performed by the processor and the on-chip memory.

2. The method of claim 1, wherein the performing the first training of each of the first layers comprises:

generating the partial input vectors based on the input feature map data of the initial layer of the first layers;

learning the initial layer, based on the partial input vectors using the self-organizing map corresponding to the initial layer; and generating the output feature map data of the initial layer using the learned initial layer.

3. The method of claim 2, wherein the learning of the initial layer comprises:

determining, using the self-organizing map, an output neuron, among output neurons, having a weight most similar to at least one of the partial input vectors;

updating, using the self-organizing map, a weight of at least one output neuron located in a determined range of the output neurons based on the determined output neuron; and learning the initial layer based on the updated weight.

4. The method of claim 1, further comprising learning a next layer of the first layers based on the output feature map data of the initial layer.

5. The method of claim 1, wherein the generating of the output data comprises:

generating output feature map data by applying the input data to the learned first layers; and generating the output data by applying the output feature map data to the learned at least one second layer.

6. A non-transitory computer-readable storage medium storing instructions that, when executed by one or more processors, configure the one or more processors to perform the method of claim 1.

7. A neuromorphic neural network implementation apparatus for performing a neuromorphic operation, the neuromorphic neural network implementation apparatus comprising:

a processor; and an on-chip memory comprising a plurality of cores and storing one or more instructions that, when executed by the processor, the processor configured to perform a first training of each of first layers included in a convolution neural network based on unsupervised learning according to a self-organizing map without using back-propagation, including determining a similarity between partial input vectors and an updated weight of at least one output neuron using input feature map data stored in the on-chip memory, wherein the self-organizing map comprises an input layer having a number of neurons equal to dimensions of an input and an output layer having a number of neurons equal to clustering target classes, and wherein each neuron of the output layer of the self-organizing map has a weight vector having the same dimension as the input and the input of the self-organizing map is clustered by classifying the input into one of most similar neuron of the output layer based on a calculated similarity between the input and the weight vector of each neuron of the output layer, perform a second training of at least one second layer included in the convolution neural network based on supervised learning according to back-propagation, and perform an inference operation by driving the processor and the on-chip memory to implement the convolution neural network, including generating output data based on input data stored in the on-chip memory, by using the learned first layers and the learned at least one second layer, wherein the first layers comprise convolutional layers of the convolution neural network to extract features from the input data and the at least one second layer comprises at least one fully-connected layer of the convolution neural network to perform classification and identification based on output feature map data extracted from the input data by the first layers, wherein the convolution neural network is implemented as a single convolution neural network including the first layers and the at least one second layer, wherein, for performing the first training, the processor is further configured to generate output feature map data for the convolutional layers via addition operation and subtraction operation instead of a MAC (multiply and accumulate) operation based on the self-organizing map, wherein the generated output feature map data of the first layers is used as an input feature map for the at least one second layer to perform the supervised learning according to the back-propagation, wherein, for generating the output feature map data, the processor is further configured to:

generate partial input vectors based on input feature map data of an initial layer of the first layers;

determine the similarity between the partial input vectors and the updated weights, to generate similarity vectors; and generate the output feature map data of the initial layer based on the similarity vectors, and wherein the similarity vectors are determined as partial output feature map data, and the partial output feature map data is matched with a coordinate of the input feature map data of which the partial input vectors are generated, to generate the output feature map data of the initial layer, and wherein the first training, the second training and the inference operation are performed by the processor and the on-chip memory.

8. The apparatus of claim 7, wherein, for the performing the first training of each of the first layers, the processor is further configured to generate the partial input vectors based on the input feature map data of the initial layer of the first layers, learn the initial layer based on the partial input vectors using the self-organizing map corresponding to the initial layer, and generate output feature map data of the initial layer using the learned initial layer.

9. The apparatus of claim 8, wherein, for the learning of the initial layer, the processor is further configured to determine, using the self-organizing map, an output neuron, among output neurons, having a weight most similar to at least one of the partial input vectors, update, using the self-organizing map, a weight of at least one output neuron located in a determined range of the output neurons based on the determined output neuron, and learn the initial layer based on the updated weight.

10. The apparatus of claim 7, wherein the processor is further configured to learn a next layer of the first layers based on the output feature map data of the initial layer.

11. The apparatus of claim 10, wherein, for the generating of the output data, the processor is further configured to generate output feature map data by applying the input data to the learned first layers, and generate the output data by applying the output feature map data to the learned at least one second layer.

12. The apparatus of claim 9, wherein the on-chip memory stores the one or more instructions that configure the processor to:

perform the first training of each of the first layers;

perform the second training of the at least one second layer; and drive the neural network to perform the generating of the output data.

* * * * *